United States Patent [19]

Janssen et al.

[11] 4,139,676

[45] Feb. 13, 1979

[54] CONSOLIDATION OF AGGREGATE MATERIAL

[75] Inventors: Edward W. Janssen, Roseville; Jon H. Simpson, St. Paul, both of Minn.

[73] Assignee: Minnesota Mining and Manufacturing Company, St. Paul, Minn.

[21] Appl. No.: 441,876

[22] Filed: Feb. 12, 1974

[51] Int. Cl.$^2$ .......................... B32B 5/16; B32B 9/00
[52] U.S. Cl. ..................................... 428/402; 166/295; 427/372 R; 427/377; 427/385 R; 427/136; 427/421; 405/264
[58] Field of Search ................ 117/123 D; 61/36 RC; 166/295; 427/372 R, 377, 385 R, 421, 136; 428/454, 402

[56] References Cited

U.S. PATENT DOCUMENTS

| | | | |
|---|---|---|---|
| 2,867,278 | 1/1959 | Mallory et al. | 166/295 |
| 3,181,611 | 5/1965 | Dollarhide | 166/295 |
| 3,181,612 | 5/1965 | West et al. | 166/295 |
| 3,367,892 | 2/1968 | Jorczak et al. | 260/2.5 |
| 3,651,649 | 3/1972 | Najvar | 61/36 |
| 3,689,305 | 9/1972 | Hausmann | 117/123 |
| 3,691,117 | 9/1972 | Messerly | 117/123 |
| 3,719,050 | 3/1973 | Asao et al. | 61/36 |
| 3,723,163 | 3/1973 | Schumacher | 117/123 |
| 3,805,531 | 4/1974 | Kistner | 61/36 |
| 3,805,532 | 4/1974 | Kister | 61/36 |

OTHER PUBLICATIONS

Sealants, Damusis, Reinhold Pub. Co., 1967, pp. 116–118, 131–133, 155 and 156.

*Primary Examiner*—Michael F. Esposito
*Assistant Examiner*—Sadie L. Childs
*Attorney, Agent, or Firm*—Cruzan Alexander; Donald M. Sell; James V. Lilly

[57] ABSTRACT

Superficial aggregate material (e.g. soil, sand) is consolidated by means of a water-insoluble, moisture-curable NCO-terminated prepolymer having defined physical properties.

12 Claims, No Drawings

CONSOLIDATION OF AGGREGATE MATERIAL

BACKGROUND OF THE INVENTION

This invention relates to the consolidation of aggregate material. In another aspect, it relates to consolidating or stabilizing superficial mineral aggregate, such as soil or sand or decorative rocks, to form a consolidated structure.

The prior art discloses the use of a host of materials and techniques for the treatment of mineral aggregate to overcome problems arising from the inherent nature of the unconsolidated aggregate. The purpose of some of such techniques has been to form load-bearing structures. In other areas polymers have been used to seal subterranean formations penetrated by well bores (e.g. see U.S. Pat. Nos. 2,867,278; 3,181,611; and 3,181,612).

Hydrophilic or water-soluble urethane prepolymers have also been successfully used in a variety of soil stabilizing techniques. For example, see U.S. Pat. No. 3,719,050; assignee's copending application Ser. No. 100,378, filed Dec. 21, 1970, now U.S. Pat. No. 3,805,531; and assignee's copending application Ser. No. 190,358, filed Oct. 18, 1971, now U.S. Pat. No. 3,805,532. Although such systems are quite useful, the stabilized aggregate does have reduced integrity when saturated with water, especially over a long period of time.

Although U.S. Pat. No. 3,367,892 describes the use of a polyurethane for stabilizing soil, the systems described there are two-part and are reacted so as to cause foaming thereof. The resulting polymer is highly foamed and does not provide an aesthetically pleasing surface. Furthermore, the resulting stabilized soil is water-impermeable.

In U.S. Pat. No. 3,651,649 there is described a method for stabilizing soil using a water-based emulsion of vinyl ester resin. The resulting stabilized soil is said to be liquid impermeable, and the polymer encapsulates or traps water droplets therein.

SUMMARY OF THE INVENTION

In accordance with the present invention there is provided a method for consolidating superficial aggregate material comprising the steps of:

(a) contacting the top surface of said aggregate with a fluid agent consisting essentially of a water-insoluble, moisture-curable NCO-terminated prepolymer which, after curing in the presence of moisture, has unfilled film properties as follows: a tear strength of at least 50 pounds per lineal inch, an elongation of at least 60%, a tensile strength of at least 50 psi at 25% elongation, a tensile strength of at least 75 psi at 50% elongation, an ultimate tensile strength of at least 500 psi; the prepolymer further having a "dry compression strength characteristic" (as later defined) of at least 100 psi, and a "wet compression strength characteristic" (as later defined) of at least 20 psi; and (b) curing the prepolymer in the presence of sufficient moisture to form a substantially nonfoamed polymer binding said aggregate together.

The fluid agent (i.e. prepolymer and liquid vehicle, if desired) used has the advantage of being a one-part system, requiring no expensive or elaborate mixing equipment for preparation thereof or for its application to the aggregate. Although the presence of a catalyst is not required, one or more catalysts may be used, if desired, to obtain faster curing of the prepolymer. Consolidation can be carried out in hot or cold weather and good results are obtained with a wide variety of types of aggregate.

Aggregate which is consolidated in accordance with the present invention has much improved dimensional stability and wet compression strength as compared to aggregate which has been stabilized according to prior techniques. Consequently, the techniques of the present invention is well suited for consolidating decorative aggregate material in outdoor locations such as patios, driveways, walkways, traffic islands, etc. where resistance to adverse weather conditions and traffic is highly desirable and where an aesthetically pleasing appearance is also highly desirable.

The consolidated aggregate is water-permeable, resilient, aesthetically pleasing, has excellent resistance to freeze-thaw cycling, and has good resistance to the effects of an outdoor environment.

DETAILED DESCRIPTION OF THE INVENTION

The fluid agent used in this invention consists essentially of a water-insoluble, moisture-curable NCO-terminated prepolymer of a type which exhibits certain physical properties after curing. The prepolymers are generally very viscous liquids and though they can be used by themselves in this invention, it is preferred to employ the same in the form of a solution in a suitable vehicle or solvent which is nonreactive with the isocyanate moiety. Thus, organic solvents, or any other organic compounds, which contain active hydrogen atoms are to be avoided in preparing the fluid agent used herein. Generally speaking, the solvent or vehicle should contain less than 0.05% by weight of water.

Generally these solvents can be either water-miscible or water-immiscible and are preferably volatile at ambient conditions. Representative solvents which can be used include acetone, 2-butanone and other ketones, toluene and other aromatic hydrocarbons, aliphatic hydrocarbons, esters, chlorinated aromatic hydrocarbons and chlorinated aliphatic hydrocarbons, tetrahydrofuran and other known ethers and glycol ethers, dimethyl formamide and other such solvents.

Conventional catalysts which promote the formation of urethane linkages may also be included in the fluid agent along with the prepolymer and solvent or vehicle. The catalyst may be used to obtain faster curing of the prepolymer at low temperatures (i.e. less than about 40° F.) or in low humidity environments (i.e. less than about 25% relative humidity).

If used, the amount of catalyst present is generally in the range of about 0.01–1 percent by weight based on the weight of prepolymer present. Conventional representative catalysts include dibutyl tin dilaurate, dibutyl tin diacetate, stannous octate, N-ethyl morpholine, triethylamine, N, N, N',N'-tetramethyl-1,3-butane diamine, 1,4-diaza (2,2,2) bicyclooctane, ferric acetylacetonate, titanium acetylacetonate, and others well known in the art.

Thus, the fluid agents used in this invention consist essentially of the water-insoluble, moisture-curable prepolymer, although a solvent and a catalyst may be included therewith. Therefore, as used herein, the phrase "consisting essentially of a water-insoluble, moisture-curable NCO-terminated prepolymer" is meant to encompass fluid agents containing prepolymer alone, prepolymer combined with a solvent, prepolymer combined with a catalyst, prepolymer combined with a solvent and a catalyst, and prepolymer combined with a solvent and minor amounts of other materials such as light stabilizers, antioxidants, pigments, dyes, etc.

Prepolymers which are useful in this invention are those which are water-insoluble, moisture-curable, NCO-terminated and which, after curing in the presence of moisture, have film properties as follows: a tear strength of at least 50 pounds per lineal inch, an elongation of at least 60%, a tensile strength of at least 50 psi at 25% elongation, a tensile strength of at least 75 psi at 50% elongation, an ultimate tensile strength (i.e. at break) of at least 500 psi, a "dry compression strength characteristic" (defined hereinafter) of at least 100 psi, and a "wet compression strength characteristic" (defined hereinafter) of at least 20 psi.

More preferably, the prepolymers are of a type which, after curing in the presence of moisture, have a tear strength of at least 75 pounds per lineal inch, an elongation of at least 100%, a tensile strength of at least 400 psi at 25% elongation, a tensile strength of at least 500 psi at 50% elongation, an ultimate tensile strength of at least 1000 psi, a "dry compression strength characteristic" of at least 400 psi, and a "wet compression strength characteristic" of at least 50 psi.

"Dry Compression Strength Characteristic"

To determine the "dry compression strength characteristic" of a given water-insoluble NCO-terminated prepolymer a defined aggregate material is mixed with a defined amount of prepolymer, pressed into a mold, cured, and then subjected to an increasing compressive force until failure of the sample occurs. The test will now be described in detail.

A. Aggregate — The aggregate material used in this test is defined as #9 coarse aggregate meeting ASTM standard D448-54 (re-approved 1973) and it is a mixture of subrounded and rounded stones having the following mechanical analysis:

| Sieve Size | Percent Aggregate Passing |
|---|---|
| ⅜ inch (9.52 mm.) | 100% |
| #4(4.76 mm.) | 93% |
| #14(1.41 mm.) | 12% |
| #40(0.42 mm.) | less than 1% |

The moisture content of the aggregate is adjusted to 1.5% by weight before use in this test.

B. Sample Preparation — The prepolymer to be tested is dissolved in acetone or other solvent to form a solution which is 65% by weight prepolymer and 35% by weight solvent. Then 6.154 parts by weight of this prepolymer solution is physically admixed with 96 parts by weight of the aggregate defined above until a uniform admixture is obtained (usually about one minute). The amount of prepolymer thus used, calculated on the dry basis, is 4 parts by weight.

One hundred grams of the uniform admixture is placed into a cylindrical mold (made of high density polyethylene plastic having an inside diameter of 1.56 ± 0.04 inches and a height of 2 inches) and pressed with a piston at 30 psi pressure for 30 seconds. The density of the test samples of aggregate at this point is 100 ± 2 pounds per cubic foot.

C. Curing — The test samples prepared above are left in the molds and are conditioned at 77 ± 2° F. and 50 ± 5% relative humidity for a period of 4 days after which the test samples are removed from the molds and conditioned for an additional 10 days in the same environment.

D. Sample Examination — After the test samples have been conditioned (i.e. cured) as described above they are visually inspected to be certain that the tops and bottoms of the cylindrically shaped samples are flat and free from cracks or chips which could affect the compression test results. The diameter and height of the test samples are also measured, along with the weight, so that the density can be calculated.

E. Sample Testing — The test sample is placed on the bearing plate of an Instron machine having a sensitivity of 0.1 pound, the test sample being so positioned that its vertical axis is aligned with the center of the machine head. The Instron machine then continuously applies an increasing force to the top of the test sample without shock by means of the machine head which moves at the rate of 0.05 inch per minute (0.02 mm. per second). The maximum force just prior to failure (i.e. cracking or fracturing) of the sample is recorded and the "dry compression strength characteristic" is reported in units of pounds per square inch. Prepolymers which are acceptable for use in this invention produce a "dry compression strength characteristic" of at least 100 psi, and preferably at least 400 psi, in this test.

"Wet Compression Strength Characteristic"

A. Aggregate — The aggregate material used in this test is that defined above with respect to the "dry compression strength characteristic" testing.

B. Sample Preparation — Same as described above with the "dry compression strength characteristic".

C. Curing — Same as described above with the "dry compression strength characteristic".

D. Sample Examination — Same as described above with the "dry compression strength characteristic".

E. Water Immersion — The test samples are next immersed in room temperature water in an open pan which is then placed under high vacuum (i.e. greater than 28 inches of mercury) for one hour so that water can permeate into the samples. The test samples remain immersed in the water for an additional 48 hours after removal of the vacuum.

F. Sample Testing — The test samples are removed from the water pan and immediately placed on the bearing plate of the Instron machine and tested in accordance with the procedure described above with respect to the "dry compression strength characteristic". Prepolymers which are acceptable for use in this invention produce a "wet compression strength characteristic" of at least 20 psi, and preferably at least 50 psi, in this test.

Water-insoluble NCO-terminated prepolymers, sometimes referred to as urethane prepolymers, used in this invention can be selected from those known in the art. In general, the NCO prepolymers are the reaction product of an equivalent excess of at least one organic polyisocyanate with one or more organic compounds having a plurality of hydroxy, thiol, or amine groups, the molar excess (molar ratio greater than one) being needed to obtain the isocyanate termination. The prepolymers generally have an average molecular weight ranging from about 400 to about 10,000, and preferably from 600 to 3000. The equivalent ratio of isocyanate moiety, —NCO, to active hydrogen will be at least 2/1, and preferably at least 2.1/1 to 2.5/1, and can be as high as 4/1 or higher.

Polyisocyanates which can be used to prepare the isocyanate-terminated prepolymers used in this invention and described above include conventional aliphatic and aromatic polyisocyanates. The preferred polyisocyanates to be used will be aromatic because the prepolymers made therefrom will generally react faster with moisture.

Any of a wide variety of organic polyisocyanates may be employed in the reaction, including aromatic, aliphatic and cycloaliphatic diisocyanates and combinations of these types. The aromatic diisocyanates include 2,4-toluene diisocyanate, mixtures thereof with 2,6-toluene diisocyanate (usually about 80/20 by weight, respectively), methylene bis(4-phenylisocyanate), m-phenylene diisocyanate, 3,3'-dimethyl-4'-diphenylene diisocyanate, 3,3'-dimethoxy-4,4'-bisphenylene diisocyanate, 3,3'-diphenyl-4,4'-biphenylene diisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate. Arylene diisocyanates, i.e. those in which two isocyanate groups are attached directly to an aromatic ring, are preferred. The diisocyanates may contain other substitutents, although those which are free from reactive groups other than the two isocyanate groups are ordinarily preferred. In the case of the aromatic compounds, the isocyanate groups may be attached either to the same or to different rings. The preferred polyisocyanates are either the commercially available mixture of toluene diisocyanates which contains 80% 2,4-toluene diisocyanate and 20% 2,6-toluene diisocyanate or 4,4'-methylene bis-(phenylisocyanate). Commercially available polymeric aromatic isocyanates having an NCO functionality greater than 2.0 are also quite useful.

Aliphatic compounds such as ethylene diisocyanate, ethylidene diisocyanate, propylene-1,2-diisocyanate, butylene-1,3-diisocyanate, tetramethylene diisocyanate, hexamethylene diisocyanate and decamethylene diisocyanate are suitable as are alicyclic compounds such as 1,2- and 1,4-cyclohexylene diisocyanates and 4,4'-methylene-bis-(cyclohexylisocyanate). Generally speaking, prepolymers based on these aliphatic isocyanates produce polymer matrices which are less subject to yellowing upon prolonged exposure to sunlight.

The organic compounds which react with the polyisocyanates to obtain the NCO-terminated prepolymers are preferably hydroxy, thiol, and amine (primary and secondary) terminated polymers having a molecular weight preferably on the order of 90 or more. Typical polymer backbones include certain polyethers, polyepihalohydrins, polythioethers, polysulfides, polyesters both of the condensation and lactone type, and polyhydrocarbons.

Illustrative polyethers are the following: poly (oxypropylene) glycols, poly(oxypropylene)-poly(oxyethylene) copolymers wherein the poly(oxyethylene) is less than about 30% by weight of the backbone, and poly-(oxytetramethylene) glycols.

Thiol terminated poly(oxyalkylene) glycols usually prepared by the acid-actalyzed condensation of thiodiethyleneglycol with itself (i.e. homopolymers of thiodiethyleneglycol) or at elevated temperatures with formaldehyde, paraformaldehyde, etc., or polyols such as 1,4-butanediol, may be employed in the preparation of NCO-terminated prepolymers. Polymers of this type with molecular weights of at least 750 are described in U.S. Pat. No. 2,900,368.

Hydroxy-terminated polysulfides such as are disclosed in U.S. Pat. No. 3,168,119, may also be employed in the practice of this invention.

Other suitable polysulfides are the liquid mercapto terminated polysulfides such as are disclosed in Patrick et al, U.S. Pat. No. 2,466,963.

Exemplary hydroxy terminated polyesters are polyethylenepropylene adipate, polyethylene adipate, polyethylene adipate (70)-phthalate (30), and polyneopentyl sebacate. In general, the most suitable polyesters have melting point levels of 90° C. or lower. The molecular weight may range between 200 and 10,000 and preferably between 1,000 and 3,000.

Hydroxy terminated lactone polyesters such as are described in U.S. Pat. Nos. 3,169,945 and 3,186,971, are also effective in preparing NCO-terminated prepolymers as are hydroxyl terminated polymers from vinyl monomers such as are disclosed in U.S. Pat. Nos. 2,792,382 and 3,055,942.

While not essential, a catalyst may be employed in the preparation of the prepolymer. Suitable catalysts include tertiary amines, such as dimethylcyclohexyl amines, triethylamine, 1,2,4-trimethylpiperazine or heavy metal compounds soluble in the reaction system such as iron-acetoacetate and dibutyltin dilaurate.

The prepolymer reaction conditions and the reaction time vary depending on the kind and molecular weight of the polymer reactants, the kind and the amount of the diisocyanate to be used, and the type of catalyst employed, if any. Generally, a temperature between 50° C. and 150° C., and a reaction time between 5 and 300 minutes is employed.

Catalysts, if employed, are generally present to the extent of about 0.01 to about 1.0% by weight of the total weight of the reactants. For moisture curable prepolymers, dibutyltin dilaurate represents the preferred catalyst.

The preferred class of water-insoluble prepolymers are those of the formula

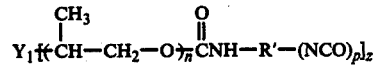

where $Y_1$ is an active hydrogen-free residue of a compound having a plurality of active hydrogen atoms, e.g. propylene glycol or propylene diamine; R' is tolylene or p,p'-diphenyl methane, "n" is the number of oxypropylene units shown, "p" is 1-2, and "z" is equal to the functionality, e.g. 2 or 3, of said compound from which $Y_1$ is derived.

Commercially available polyol precursors useful in making the above-described water-insoluble isocyanate terminated prepolymers used in this invention generally have molecular weights of at least 90 and can be as high as 6000; preferably they will have molecular weights of 90 to 2000. Representative polyols having oxypropylene backbone chains are commercially available under the tradename "Niax Polyol PPG 1025" and "Niax Polyol LHT-240" from Union Carbide. Representative polyols having oxytetramethylene backbone chains include "Polymeg 1000 and 2000" available from Quaker Chemical Company. Polyols having saturated aliphatic hydrocarbon backbone chains include "Polycin 51" available from Baker Castor Oil Company. Polyols having lactone backbone chains include "Niax Polyol PCP-0210", and others from Union Carbide.

In practicing this invention the prepolymer is preferably first dissolved in a solvent at a concentration of about 25 to 90 weight percent so as to adjust the viscosity of the material into the range of about 5 to 200 cps.

Solutions more viscous than this do not percolate into superficial aggregate as readily as desired.

Conventional catalysts (as described hereinabove), ultraviolet light stabilizers and antioxidants, and colorants may also be added to the solution in minor amounts if desired. Upon application of the fluid agent (i.e. prepolymer with or without solvent, catalysts, and other additives) to the superficial aggregate material to be consolidated, the prepolymer reacts with moisture presently in such aggregate (or absorbed from the air) to form a substantially non-foamed polymeric matrix adhesively binding the aggregate into a unitary integral mass. The polymeric matrix is aesthetically pleasing, water-permeable, water-insoluble and tough. Since the matrix will deform and yield (i.e. is not brittle) it will not fracture easily. Consequently, the matrix is resilient and extremely durable. The matrix also exhibits good compressive strength even when soaked with water.

So as to minimize the amount of foaming obtained during the formation of the polymer matrix, it is highly preferable for the superficial aggregate to contain a low percentage of available moisture, e.g. less than about 15 weight percent for clay and less than about 2 weight percent for rock. The desired amount of moisture in other types of aggregate having a particle size between that of clay and rock will be correspondingly between about 2 and 15 percent. Although some minimal amount of bubble formation may still result, significant foaming of the polymer is to be avoided so that good binding strengths are achieved.

Generally, the amount of prepolymer used is in the range of 0.5 to 20 weight percent or more, preferably in the range of 2 to 10 weight percent, based on the weight of the aggregate. Using amounts greater than about 20 weight percent is not economically advantageous and does increase the tendency of the polymer to foam, thereby reducing the matrix strength and interfering with an aesthetically pleasing appearance.

The prepolymer is typically applied to the top surface of the aggregate by spraying or coating. After application of the prepolymer to the superficial aggregate it is permitted to permeate therethrough (e.g. to a depth of one-half to six inches or more) before moisture-curing.

The mass of aggregate can be treated as found in its natural state or after it has been relocated, reshaped, or refined. Also, the consolidated mass can be relocated after it is formed.

To further improve the compressive strength (both wet and dry) it is possible to pre-treat the aggregate material with an adhesion promoter (e.g. a material containing a reactive silane group). A preferred silane, which can be used effectively in an aqueous solution to pre-treat aggregate, or in undiluted form can be simply added to the prepolymer, is N-phenyl-gamma-aminopropyltrimethoxy silane. Other useful silanes are described in U.S. Pat. No. 3,627,722.

The types of aggregate material which can be consolidated in accordance with this invention can vary. In general the aggregate may be solid particulate matter such as soil (e.g. black dirt, clay, sand, gravel), other siliceous materials, stones, mineral aggregate (e.g. perlite, vermiculite), or synthetic aggregate (e.g. ground glass), tire scraps, etc.

The invention will find application in connection with agronomic practices, e.g. erosion prevention of top soil due to rain or wind, or in connection with landscaping or construction of roadways, airfields, footpaths, embankments, graded construction sites, water courses (such as irrigation ditches), water reservoirs, earth-filled dams, and athletic playing surfaces such as tennis courts and running paths, bicycle paths, etc. Consolidated top soil or sand can also be overlayed with other construction material.

The invention will be further illustrated by means of the following examples, wherein the term "parts" refers to parts by weight unless otherwise indicated.

EXAMPLE 1

A water-insoluble moisture-curable NCO-terminated prepolymer useful for consolidating aggregate material is prepared using the following ingredients in the amounts stated.

| Ingredient | Equivalents | Parts |
| --- | --- | --- |
| Toluene diisocyanate (80/20 mixture by weight of 2,4- and 2,6-isomers) | 7.0 | 611.1 |
| Toluene | — | 180.6 |
| Polypropylene oxide diol (1000 mol. wt.) | 0.7 | 348.6 |
| Polypropylene oxide triol (710 mol. wt.) | 2.8 | 669.2 |
| Dibutyl tin dilaurate | — | 1.1 |
| Acetone | — | 697.1 |

The toluene and toluene diisocyanate are added to a nitrogen-purged resin flask. The diol and triol are then added with mixing and the temperature is raised to 80° C. and held there for 4 hours, after which it is cooled to 60° C. followed by addition of the dibutyl tin dilaurate catalyst. At this point the prepolymer has a Gardner-Holt viscosity of 75–100 stokes and an isocyanate equivalent of 450–550. The prepolymer is then cooled to 30° C. and the acetone (containing less than 0.03% water) is added to dissolve the prepolymer.

The prepolymer, after moisture curing, exhibited the following physical properties:

| | |
| --- | --- |
| Tear strength | 370 pounds per lineal inch |
| Elongation | 125% |
| Tensile strength at break | 4320 psi |
| Dry compression strength characteristic | 1129 psi |
| Wet compression strength characteristic | 89 psi |

EXAMPLE 2

The prepolymer solution of Example 1 is used to consolidate various types of stones up to 4 inches in diameter at application rates of 1.5 to 15 parts by weight prepolymer solution to 100 parts by weight of stones. The stones had a moisture content of less than 1 percent by weight. In all instances the stones are firmly bonded into an integral mass of good compressive strength which supports foot traffic without damage to the bonded mass. The bonded mass is also sufficiently flexible to withstand sub-base movement, such as that caused by frost heaving action in the soil, without damage.

EXAMPLE 3

A patio is constructed using the prepolymer solution of Example 1. Subrounded river washed rock of one-half inch (minus) diameter is placed into a 10 feet by 10 feet area (surrounded by 2 inch by 4 inch redwood boards or other appropriate forms) at a depth of one inch or more and levelled. The prepolymer solution of Example 1 is then sprayed (airless) onto the rock mass at a rate of one gallon per 20 square feet. The prepolymer cures by absorbing moisture from the air.

After 24 hours the surface is tack-free and will support foot traffic without damage thereto. After 48 hours the consolidated rock is very firm and will support tremendous weight (e.g. an automobile) without damage. The thickness of the stabilized layer of rock varies from three-fourths inch to one and one-half inches. After 6 months the patio is still in excellent condition with no signs of deterioration.

Good results are obtained when applying the prepolymer solution at a rate in the range about one gallon per ten square feet or less up to 35 square feet per gallon.

EXAMPLE 4

Bicycle trails are prepared by applying the prepolymer solution of Example 1 to a layer of compacted crushed quarry rock aggregate having a depth of about 4-6 inches and a moisture content of about 6 percent by weight. The rock aggregate (which is commonly used as the surfacing base for asphalt in highway construction) has the following mechanical analysis:

| Sieve Size | Percent Aggregate Passing |
|---|---|
| ¾ inch (19 mm.) | 100 |
| ⅜ inch (9.52 mm.) | 65-90 |
| #4 (4.76 mm.) | 35-70 |
| #10 (2.0 mm.) | 25-45 |
| #40 (0.42 mm.) | 12-30 |
| #200 (0.074 mm.) | 5-13 |

After the aggregate surface is levelled the prepolymer solution of Example 1 is sprayed onto the aggregate at a rate of one gallon per 20 square feet. The prepolymer solution penetrates into the aggregate to a depth of one-half to two inches. The prepolymer cures by absorbing moisture from the air.

After 24 hours the surface is tack-free and will support bicycle traffic. The natural appearance of the aggregate is changed only slightly by the prepolymer. The consolidated aggregate is very tough and durable and is aesthetically pleasing.

Other suitable bicycle trails are prepared using various other aggregates such as sand, sand and stone blends, gravel, soil, etc. The consolidated aggregate mass is flexible and withstands ground disturbances such as frost heaving without damage.

EXAMPLES 5-7

Other useful water-insoluble, moisture-curable NCO-terminated prepolymers are prepared using the ingredients in the amounts stated.

| | Number of Equivalents | | |
|---|---|---|---|
| Example | Triol[a] | Diol[b] | TDI[c] |
| 5 | 1 | — | 2 |
| 6 | 1 | 1 | 4 |
| 7 | 1 | 2 | 6 |

[a] Polypropylene oxide backbone chain; 710 molecular weight.
[b] Polypropylene oxide backbone chain; 1000 molecular weight.
[c] 80/20 blend of 2,4- and 2,6-toluene diisocyanate.

The isocyanate equivalent weight of the resulting prepolymers is 350-450 for Example 5, 450-600 for Example 6, and 600-750 for Example 7.

Each of the prepolymers is diluted to less than 80% solids by weight using an organic solvent (e.g. acetone) so as to reduce the viscosity thereof. These prepolymers, after moisture curing, exhibit the following minimum physical properties:

| | |
|---|---|
| Tear strength | at least 75 pounds per lineal inch |
| Elongation | at least 100% |
| Tensile strength (25% elongation) | at least 400 psi |
| Tensile strength (50% elongation) | at least 500 psi |
| Tensile strength (at break) | at least 1000 psi |
| Dry compression strength characteristic | at least 400 psi |
| Wet compression strength characteristic | at least 50 psi |

EXAMPLE 8

A concrete patio with large cracks and defects is resurfaced by first covering the patio with a ¾ inch thick layer of river washed subrounded stones (½ inch diameter and smaller). The stones are placed in an area 10 feet by 10 feet surrounded by 1 inch by 4 inch redwood boards (lying flat). After levelling the surface of the stone aggregate it is sprayed with the prepolymer solution of Example 1 at a rate of one gallon of prepolymer solution per 20 square feet. Moisture from the air cures the prepolymer.

After 24 hours the consolidated stone aggregate is tack-free and will support foot traffic. The consolidated aggregate is also firmly bonded to the concrete surface. Similar results are obtained using the prepolymers of Examples 5-7 at an application rate of one gallon per 10-35 square feet of surface.

Using similar techniques colored or decorative designs on patios, walkways, etc. may be obtained by first applying colored quartz granules (typically 6-28 mesh) on the desired surface, and in the desired pattern, at a depth of about ⅛ inch to 2 inches. The prepolymer solution is then applied thereto and moisture-cured.

EXAMPLE 9

A resilient surface serving as a golfers walkway is prepared by first providing a path of rubber tire scraps and shavings, at a depth of one-half to one inch thick, over a suitable base such as asphalt, concrete, soil, rock, etc. The tire scraps may vary from 1/32 inch (major diameter) to 1.5 inches (major diameter). The prepolymer solution of Example 1 (or of Examples 5-7) is then applied to the rubber aggregate and penetrates therethrough. Upon curing of the prepolymer the rubber aggregate is firmly bonded together into an integral mass which can withstand spiked-shoe traffic after 48-72 hours.

EXAMPLE 10

A drainage ditch having a soil bottom and sides is stabilized by applying thereto the prepolymer solution of Example 1 at a rate of one gallon per 20 square feet of soil. After curing of the prepolymer (by absorbing moisture from the air), the solidified soil layer is ½ to 3 inches thick and is very erosion resistant as compared to similar ditches left untreated.

EXAMPLE 11

Traffic islands filled with stones of various sizes and shapes are stabilized by applying thereto the prepolymer of Example 1 (or of Examples 5-7) followed by moisture curing. The stabilized islands are more easily cleaned of debris and no longer lose stones to the roadway.

properties, after moisture-curing, are set forth in TABLE II, below.

TABLE I

| Example | Polyol-Type Diol-Mol.Wt. | Polyol-Type Triol-Mol.wt. | Polyol-Equivalents Diol | Polyol-Equivalents Triol | Isocyanate - Type | Isocyanate - Equivalents |
|---|---|---|---|---|---|---|
| 15 | a - 3000 | a - 5900 | 1.0 | 1.0 | b - TDI | 4.0 |
| 16 | a - 1275<br>c - 90 | d - 135 | 1.25<br>0.625 | 2.5 | b - TDI | 7.875 |
| 17 | a - 1000 | a - 710 | 1.0 | 4.0 | f - MDI | 10.0 |
| 18 | g - 1260 | g - 539 | 1.0 | 4.0 | b - TDI | 10.0 |
| 19 | g - 1260 | g - 539 | 2.0 | 0.1 | b - TDI | 4.2 |
| 20 | g - 2000<br>c - 90 | a - 710 | 1.0<br>2.0 | 1.0 | b - TDI | 8.0 |
| 21 | g - 1250<br>c - 90<br>g - 2000 | None | 1.0<br>1.0<br>1.0 | None | b - TDI | 6.0 |
| 22 | g - 830<br>c - 90 | None | 1.0<br>1.0 | None | b - TDI | 4.0 |
| 23 | e | | | | - aliphatic | (Equivalent wt. 461) | a - polypropylene oxide backbone chain
b - 80/20 blend of 2,4- and 2,6-toluene diisocyanate
c - 1,4-butane diol
d - trimethylol propane
e - castor oil backbone chain (Vorite 686, commercially available from Baker Castor Oil Co.)
f - p,p'-diphenylmethane diisocyanate
g - poly-ε-caprolactone backbone chain

TABLE II

| Example | Compression Strength Characteristic (Psi) Dry | Compression Strength Characteristic (Psi) Wet | Tear Strength (Pounds Per Lineal Inch) | Elongation (%) | Tensile Strength at 25% Elongation (psi) | Tensile Strength at 50% Elongation (psi) | Tensile Strength at Break (psi) |
|---|---|---|---|---|---|---|---|
| 15 | 120 | 20 | 64 | 1578 | 52 | 75 | 813 |
| 16 | 856 | 302 | 204 | 65 | 3220 | 3528 | 3759 |
| 17 | 422 | 20 | 210 | 1250 | 140 | 155 | 3300 |
| 18 | 528 | 126 | 330 | 120 | 1778 | 2067 | 2856 |
| 19 | 125 | 36 | 246 | 468 | 354 | 440 | 6070 |
| 20 | 692 | 121 | 531 | 255 | 932 | 1070 | 4161 |
| 21 | 312 | 70 | 349 | 470 | 547 | 644 | 7171 |
| 22 | 392 | 60 | 980 | 330 | 1408 | 1590 | 7370 |
| 23 | 460 | 150 | 75 | 80 | 300 | 360 | 1800 |

EXAMPLE 12

Decorative stone aggregate placed around shrubbery, trees, poles, buildings, etc. is consolidated by applying thereto the prepolymers of Examples 1 and 5-7, followed by moisture curing. The consolidated aggregate is then no longer a hazard for lawn mowing equipment and is not easily removed or eroded away.

EXAMPLE 13

Highway shoulders are stabilized and made more durable and load-bearing by applying thereto the prepolymers of Examples 1 and 5-7 at a rate of one gallon per 10-50 square feet of surface, followed by moisture curing.

EXAMPLE 14

The compressive strength of subgrade soil is remarkably improved by consolidating the soil with 1-20 weight percent of the prepolymer of Examples 1 and 5-7. As an example, soil (AASHO Group A-6) having a dry compressive strength characteristic of 450 psi and a wet compressive strength characteristic of 0 psi is significantly improved by mixing therewith 3% by weight of the prepolymer solution of Example 1. After 7 days at ambient conditions the stabilized soil samples exhibited a dry compressive strength characteristic of 1900 psi and a wet compressive strength characteristic of 200 psi.

EXAMPLES 15-23

Other suitable water-insoluble, moisture-curable NCO-terminated prepolymers useful in this invention are described in TABLE I and their respective physical

What is claimed is:

1. A method for consolidating superficial aggregate material comprising the steps of:
    (a) contacting the top surface of said aggregate with a fluid agent consisting essentially of a water-insoluble, moisture-curable NCO-terminated prepolymer and an organic solvent therefor, said prepolymer, after curing in the presence of moisture, having a tear strength of at least 75 pounds per lineal inch, an elongation of at least 100%, a tensile strength of at least 400 psi at 25% elongation, a tensile strength of at least 500 psi at 50% elongation, an ultimate tensile strength of at least 1000 psi, a dry compression strength characteristic of at least 400 psi, and a wet compression strength characteristic of at least 50 psi, and
    (b) curing said prepolymer in the presence of sufficient moisture to form a substantially nonfoamed polymer binding said aggregate together in a water-permeable mass.

2. A method in accordance with claim 1, wherein said fluid agent is sprayed onto the top surface of said aggregate.

3. A method in accordance with claim 1, wherein said aggregate comprises siliceous material.

4. A method in accordance with claim 1, wherein said aggregate material comprises soil.

5. A method in accordance with claim 1, wherein said prepolymer is of the formula

where $Y_1$ is an active-hydrogen-free residue of a compound having a plurality of active hydrogen atoms; R' is tolylene or p,p'-diphenyl methane; "p" is 1 to 2; and "z" is 2 or 3; wherein said prepolymer has a molecular weight of 600 to 3000.

6. An integral mass of aggregate consolidated in accordance with the method of claim 1.

7. A method in accordance with claim 1, wherein said aggregate comprises scrap rubber.

8. A method in accordance with claim 1, wherein said NCO-terminated prepolymer has a backbone selected from the group consisting of oxypropylene, oxytetramethylene, saturated aliphatic hydrocarbons, lactones and other polyesters derived from glycols and carboxylic acids, thioethers, alkyl sulfides and epihalohydrins.

9. A method in accordance with claim 8, wherein said backbone is an oxypropylene chain.

10. A method in accordance with claim 8, wherein said backbone is a saturated aliphatic hydrocarbon chain.

11. A method in accordance with claim 8, wherein said fluid agent further contains a catalyst.

12. A method in accordance with claim 8, wherein said prepolymer, after curing, has an ultimate tensile strength of at least about 1800 p.s.i.

* * * * *